(12) United States Patent
Nozawa et al.

(10) Patent No.: US 9,638,788 B2
(45) Date of Patent: May 2, 2017

(54) APPARATUS FOR DETECTING CREEPING OF RADAR WAVES

(71) Applicant: DENSO CORPORATION, Kariya, Aichi-pref. (JP)

(72) Inventors: Toyohito Nozawa, Aichi-ken (JP); Tatsuya Namikiri, Seoul (KR)

(73) Assignee: DENSO CORPORATION, Kariya, Aichi-pref. (JP)

( * ) Notice: Subject to any disclaimer, the term of this patent is extended or adjusted under 35 U.S.C. 154(b) by 426 days.

(21) Appl. No.: 14/490,848

(22) Filed: Sep. 19, 2014

(65) Prior Publication Data

US 2015/0084807 A1   Mar. 26, 2015

(30) Foreign Application Priority Data

Sep. 20, 2013   (JP) .................................. 2013-195488

(51) Int. Cl.
    *G01S 7/02*       (2006.01)
    *G01S 13/58*      (2006.01)
    (Continued)

(52) U.S. Cl.
    CPC ................ *G01S 7/02* (2013.01); *G01S 7/354* (2013.01); *G01S 7/40* (2013.01); *G01S 13/345* (2013.01);
    (Continued)

(58) Field of Classification Search
    CPC . G01S 7/02; G01S 13/70; G01S 7/354; G01S 13/584; G01S 13/345; G01S 13/931; G01S 7/40; G01S 13/588; G01S 13/42
    (Continued)

(56) References Cited

U.S. PATENT DOCUMENTS 3,691,558 A * 9/1972 Hoard .................... G01S 13/56
                                               340/501
6,204,802 B1 * 3/2001 O'Conner ................ G01S 7/04
                                               342/101
(Continued)

FOREIGN PATENT DOCUMENTS

JP    2001-209900        8/2001
JP    2003130944 A  *    5/2003
(Continued)

OTHER PUBLICATIONS

Office Action dated Nov. 17, 2015 in corresponding Korean Application No. 10-2014-0125243 with English translation.
(Continued)

*Primary Examiner* — John B Sotomayor
(74) *Attorney, Agent, or Firm* — Harness, Dickey & Pierce, P.L.C.

(57) ABSTRACT

An apparatus that detects creeping of radar waves includes: a transmitter transmitting radar waves; a receiver receiving incoming waves from a target; a distance detecting unit detecting a first distance which is a distance up to the target; a speed derivation unit deriving a relative speed relative to the target; a distance estimating unit estimating, based on the relative speed, a second distance which is a distance up to the target; and a creeping detecting unit determining whether or not a creeping has occurred in accordance with whether or not the differential distance representing a deviation quantity between the first distance and the second distance is larger than or equal to a predetermined threshold.

13 Claims, 5 Drawing Sheets

(51) Int. Cl.
  *G01S 7/40*  (2006.01)
  *G01S 13/34*  (2006.01)
  *G01S 13/93*  (2006.01)
  *G01S 7/35*  (2006.01)
  *G01S 13/70*  (2006.01)
  *G01S 13/42*  (2006.01)

(52) U.S. Cl.
  CPC .......... *G01S 13/584* (2013.01); *G01S 13/588* (2013.01); *G01S 13/70* (2013.01); *G01S 13/931* (2013.01); *G01S 13/42* (2013.01)

(58) Field of Classification Search
  USPC .............................. 342/112, 125, 129, 70–72
  See application file for complete search history.

(56) References Cited

U.S. PATENT DOCUMENTS

| | | | | |
|---|---|---|---|---|
| 6,518,916 | B1* | 2/2003 | Ashihara | G01S 7/412 342/133 |
| 7,667,636 | B2* | 2/2010 | Kikuchi | B60W 10/184 342/70 |
| 2004/0125011 | A1* | 7/2004 | Kumon | G01S 13/345 342/70 |
| 2004/0150549 | A1* | 8/2004 | Kumon | G01S 7/412 342/70 |
| 2004/0174292 | A1 | 9/2004 | Isaji | |
| 2005/0024258 | A1* | 2/2005 | Matsuoka | G01S 13/584 342/70 |
| 2005/0093735 | A1* | 5/2005 | Samukawa | B60T 7/22 342/70 |
| 2005/0159875 | A1 | 7/2005 | Chia | |
| 2005/0225478 | A1* | 10/2005 | Nakamura | G01S 7/4802 342/70 |
| 2007/0008211 | A1* | 1/2007 | Yamano | G01S 13/589 342/70 |
| 2012/0059564 | A1 | 3/2012 | Kim | |
| 2015/0084807 | A1* | 3/2015 | Nozawa | G01S 7/354 342/112 |

FOREIGN PATENT DOCUMENTS

| | | |
|---|---|---|
| JP | 2004/271233 A | 9/2004 |
| JP | 2004-330890 | 11/2004 |
| KR | 10-2012-0025908 | 3/2012 |

OTHER PUBLICATIONS

Office Action dated Jan. 26, 2016 in corresponding Japanese Application No. 2013-195488 with English translation.
Office Action dated Jul. 14, 2015, issued in the corresponding JP Application No. 2013/195488 with English Translation.

* cited by examiner

APPARATUS FOR DETECTING CREEPING OF RADAR WAVES

CROSS-REFERENCE TO RELATED APPLICATION

This application is based on and claims the benefit of priority from earlier Japanese Patent Application No. 2013-195488 filed Sep. 20, 2013, the description of which is incorporated herein by reference.

BACKGROUND

Technical Field

The present disclosure relates to an apparatus for detecting an occurrence of a creeping of radar waves by using a result of transmission/reception of radar waves.

Description of the Related Art

Conventionally, a radar apparatus mounted on a vehicle, detecting a target based on a result of transmission/reception of the radar waves is known.

For example, Japanese Patent Application Laid-Open Publication Number 2004-330890 discloses a radar apparatus in which radar waves are transmitted at every measurement cycle and a distance (hereinafter referred to detected distance) to the target (e.g., preceding vehicle) from which the radar waves are reflected is detected based on an elapsed time from when the radar waves are transmitted to when the apparatus receives the incoming waves.

In a radar apparatus, when creeping occurs, a problem arises that the radar apparatus erroneously detects a distance longer than a distance from the back end of the preceding vehicle to be the detected distance. It is noted that creeping is a phenomena where radar waves get under the chassis of the preceding vehicle so that the radar apparatus erroneously detects a distance up to a front part of the preceding vehicle rather than the back end of the preceding vehicle, to be the detected distance.

Figure 6A:
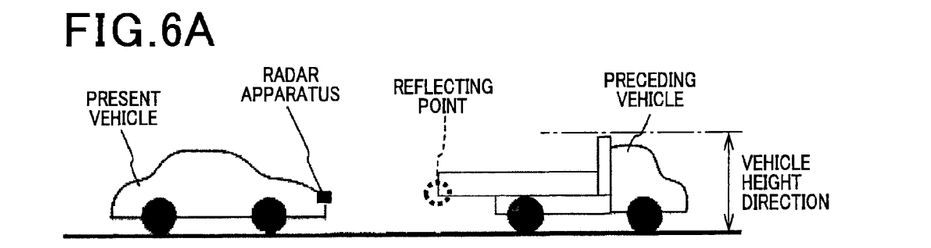
FIG. 6A is an explanatory diagram showing a mode of irradiation of the radar waves when detecting the distance up to the preceding vehicle.
Figure 6B:
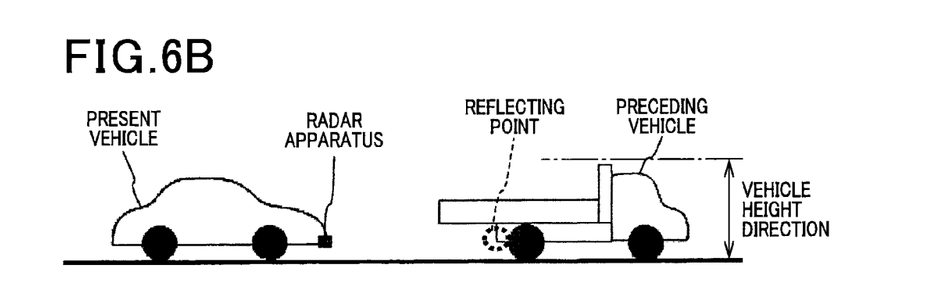
FIG. 6B is an explanatory diagram showing a mode of irradiation of the radar waves when creeping has occurred.

In other words, as shown in FIG. 6A, the radar waves are usually reflected at the back end of the preceding vehicle so that the radar apparatus is able to detect the distance up to the back end of the preceding vehicle as a detected distance. However, as shown in FIG. 6B, when the preceding vehicle is a heavy truck having high vehicle height and the distance between the present vehicle (vehicle where the radar apparatus is mounted) and the preceding vehicle is close, the radar waves get under the chassis of the preceding vehicle depending on the height of location where the radar apparatus is mounted in the vehicle height direction. In this case, since the radar waves are reflected at a front part of the preceding vehicle (e.g., drive shaft) rather than the back end thereof, the radar apparatus detects the distance up to the front part thereof to be the detected distance.

To solve the above-described problem, the radar apparatus disclosed by the above-described patent document determines that the creeping has occurred when a difference among detected distances detected during consecutive measurement periods with respect to the time axis (hereinafter referred to distance variation) increases to be larger than or equal to a predetermined value set in advance.

Generally, a vehicle running on the road repeatedly accelerates/decelerates. Hence, when the vehicle repeatedly accelerates and decelerates, the real distance between the present vehicle on which the radar apparatus is mounted and the preceding vehicle varies with respect to the time axis every time when the vehicle accelerates or decelerates. Also, the detected distance detected by the radar apparatus varies with respect to the time axis as well.

In this case, when the distance variation increases to be larger than or equal to the predetermined threshold, the following problem arises. That is, although the real distance between the present vehicle and the preceding vehicle varies, the radar apparatus according to the above-described patent document erroneously determines that creeping has occurred.

In other words, according to radar apparatuses in the related art, there is a concern that an accuracy of detecting whether or not the creeping has occurred is low.

SUMMARY

The embodiment provides an apparatus for detecting a creeping of radar waves in which the accuracy of detecting the creeping of the radar waves is enhanced. The apparatus according to the present disclosure includes a transmitter, a receiver, a distance detecting unit, a speed derivation unit, a distance estimating unit and a creeping detecting unit.

Among these units, the transmitter transmits, at every measurement cycle, frequency-modulated radar waves in which the frequency is modulated to be increased or decreased with respect to time, the receiver receives incoming waves which are reflected waves of the radar waves transmitted by the transmitter and generates a beat signal at every measurement cycle by mixing the received incoming waves with the radar waves being transmitted by the transmitter The distance detecting unit detects, based on the beat signal, the first distance which is a distance up to the target reflecting the radar waves. The speed derivation unit derives, based on the beat signal, a relative speed relative to the target reflecting the radar waves. The distance estimating unit estimates, based on the relative speed derived by the speed derivation unit, a second distance which is a distance up to the target reflecting the radar waves.

Further, a creeping detecting unit derives a differential distance representing a deviation quantity between the first distance and the second distance based on the first distance detected by the distance detecting unit and the second distance estimated by the distance estimating unit and determines whether or not a creeping has occurred in accordance with whether or not the differential distance is larger than or equal to a predetermined threshold.

In such an apparatus described above, the differential distance used to determine whether or not the creeping has occurred is the deviation quantity between the first distance and the second distance. The respective information used to derive (estimate) the first distance and the second distance are indexes different from each other depending on the respective distances.

Hence, according to the apparatus for detecting the creeping, an occurrence of the creeping can be determined based on the deviation quantity of the distance which is identified by the mutually different indexes, whereby the accuracy for determining an occurrence of the creeping can be enhanced.

DETAILED DESCRIPTION OF THE PREFERRED EMBODIMENTS

With reference to the drawings, an embodiment of the present disclosure is described as follows.

(Regarding the Driving Support System)

Figure 1:
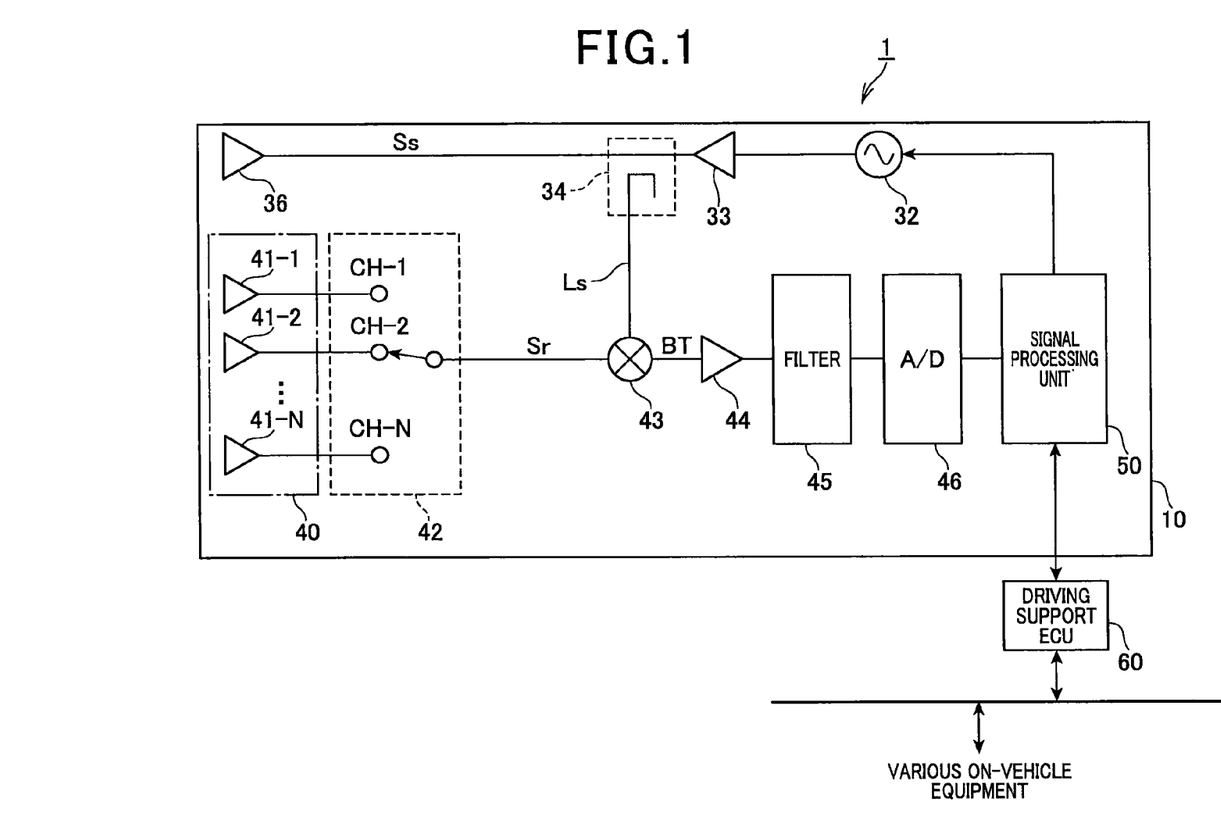
FIG. 1 is a block diagram showing an overall configuration of the driving support system equipped with a creeping detection apparatus for which the present disclosure is adapted.

The driving support system 1 as shown in FIG. 1 is a system mounted on the vehicle for executing a driving support control.

The driving support control described here is a control procedure to enhance a running safety of the vehicle and includes functions such as an adaptive cruise control (ACC) and a pre-crash safety system (PCS).

In the adaptive cruise control (ACC), the inter-vehicle distance between the present vehicle and the preceding vehicle is maintained to be an appropriate interval. The pre-crash safety system (PCS) increases the braking force of the present vehicle and the retaining force of the seatbelt when it is unable to avoid a collision between the present vehicle and an obstacle on the running path of the present vehicle.

To implement the above-described functions, the driving support system 1 includes radar sensor 10 and driving support electronic control unit (hereinafter referred to driving support ECU) 60. Hereinafter, the vehicle equipped with the driving support system 1 is referred to as the present vehicle.

The radar sensor 10 is configured as a FMCW (Frequency Modulated Continuous Wave) millimeter wave radar apparatus in which continuous waves in millimeter band being frequency-modulated with respect to the time base (hereinafter referred to radar waves) are transmitted and radar waves (incoming waves) reflected at the target are received, whereby the target such as a preceding vehicle or a roadside target is recognized. At the same time, the radar sensor 10 generates target information regarding the recognized target and transmits the target information to the driving support ECU 60. It is noted that the target information includes at least a relative speed between the present vehicle and the target, location of the target (i.e., distance and azimuth) and type of target (e.g., preceding vehicle or roadside target).

The driving support ECU 60 is constituted by a well-known microcomputer including at least ROM, RAM and CPU. Further, the driving support ECU 60 includes a bus controller used for performing communication via the LAN (local area network) communication bus.

Moreover, on-vehicle control unit and on-vehicle equipment (not shown) are connected to the driving support ECU 60 via the LAN communication bus. The on-vehicle control unit includes at least a brake control apparatus, an engine control apparatus and a seatbelt control apparatus. The on-vehicle equipment includes an alert buzzer, a monitor, a cruise control switch and a target inter-vehicle distance setting switch.

The brake control unit controls braking force applied to the present vehicle in accordance with a target acceleration factor, a brake request and a brake state transmitted by the driving support ECU 60. The engine control apparatus controls driving force in the internal combustion engine and the driving system in accordance with an operating state based on the target acceleration factor and a fuel cut request transmitted from the driving support ECU 60. The seatbelt control apparatus drives a motor (not shown) so as to control the retaining force of the seatbelt, when receiving an emergency signal from the driving support ECU 60, indicating that collision between the present vehicle and a target cannot be avoided.

The driving support ECU 60 controls the on-vehicle control unit and the on-vehicle equipment based on the target information transmitted by the radar sensor 10 so as to operate a driving support control.

(Configuration of the Radar Sensor)

The radar sensor 10 is provided with oscillator 32, amplifier 33, distributor 34 and transmission antenna 36.

The oscillator 32 generates a millimeter-wave high frequency signal (hereinafter referred to as a high frequency signal) which is frequency-modulated. The high frequency signal is modulated to have two sections during one modulation period, i.e., an upward section where the frequency increases linearly with respect to the time (gradual increase) and a downward section where the frequency decreases linearly with respect to the time (gradual decrease). The amplifier 33 amplifies the high frequency signal generated by the oscillator 32.

The distributor 34 distributes the output signal of the amplifier 33 into transmission signal Ss and local signal Ls. The transmission antenna 36 radiates the radar waves corresponding to the transmission signal Ss. The radar sensor 10 is provided with reception antenna 40, reception switch 42, mixer 43, amplifier 44, filter 45, analog to digital (A/D) converter 46 and signal processing unit 50. It is noted that the oscillator 32, the amplifier 33, the distributer 34 and the antenna 36 constitute the transmitter.

The reception antenna unit 40 includes N antennas, i.e., antenna 41-1 to 41-N (N is two or more natural number) that receive radar waves. In the respective antennas 41-1 to 41-N, channels CH1 to CH-N are assigned thereto. The reception switch 42 subsequently selects one antenna from among the antenna 41-1 to 41-N so as to supply reception signal Sr of the selected antenna among the antenna 41-1 to 41-N to the subsequent circuit block.

The mixer 43 mixes the reception signal Sr amplified by the amplifier 44 with the local signal Ls so as to generate beat signal BT representing a frequency difference between the transmission signal Ss and the reception signal Sr. The amplifier 44 amplifies the beat signal BT supplied by the mixer 43. The filter 45 eliminates unnecessary signal components from the beat signal BT generated by the mixer 43. The A/D converter samples the output signal of the filer 45 to be converted into the digital data. It is noted that the reception antenna unit 40, the antenna 41-1 to 41-N, the reception switch 42 and the mixer 43 constitute the receiver.

The signal processing unit 50 is constituted by a well-known microcomputer including at least ROM, RAM and CPU. Further, the signal processing unit 50 includes a calculation unit used for performing such as Fast Fourier Transformation (FFT) processing (e.g., DSP: digital signal processor) to the data acquired via the A/D converter 46.

The signal processing unit 50 performs activation/deactivation of the oscillator 32 and controls the sampling of the beat signal BT via the A/D converter 46. At the same time, the signal processing unit 50 performs signal processing by using sampling data and an information communication process in which information necessary for signal processing (e.g., vehicle running speed) and target information acquired as a result of the signal processing thereof are transmitted/received between the signal processing unit 50 and the driving support ECU 60.

Further, the signal processing unit 50 detects a target from which the radar waves are reflected by using the sampling data of the beat signal BT and performs a target detecting process for generating target information regarding the target.

(Overview of an Operation of the Radar Sensor)

In the radar sensor 10, when the oscillator 32 oscillates in response to a command transmitted from the signal processing unit 50 so as to generate the high frequency signal, the amplifier 33 amplifies the high frequency signal and the distributor 34 distributes the high frequency signal amplified by the amplifier 33, thereby generating the transmission signal Ss and the local signal Ls. Moreover, the radar sensor 10 transmits the transmission signal Ss as radar waves via the transmission antenna 36.

Subsequently, the radar waves transmitted from the transmission antenna 36 and reflected at the target (i.e., incoming waves) are received at all antennas 41-1 to 41-N that constitute the reception antenna 40. Then, only the reception signal Sr of the reception channel CH-i (i=1 to N) which has been selected by the reception switch 42 is amplified by the amplifier 33 and supplied to the mixer 43. The mixer 43 generates the beat signal BT by mixing the local signal Ls from the distributor 34 to the reception signal Sr. After unnecessary signal components are eliminated from the beat signal BT, the beat signal BT is sampled by the A/D converter 46 to be acquired by the signal processing unit 50.

The reception switch 42 is switched during one modulation period of the radar waves such that every channel from CH-1 to CH-N is selected for a predetermined times (e.g., 512 times). The A/D converter 46 synchronizes with the switching timing so as to sample the selected channel. In other words, during the one modulation period of the radar waves, sampling data is accumulated at every channel from CH-1 to CH-N and at every upward section and downward section.

The signal processing unit 50 detects the target that reflects the radar waves based on the sampling value of the beat signal BT and acquires distances up to respective targets, relative speed between the present vehicle and the target and an azimuth where the target exists (hereinafter referred to incoming azimuth). The signal processing unit 50 identifies whether the target is a preceding vehicle or a roadside target (i.e., type of target) based on the information (distance, relative speed and incoming azimuth) regarding the respective targets.

Moreover, the signal processing unit 50 outputs the target information including the distances up to respective targets, the relative speed between the present vehicle and the target and the incoming azimuth to the driving support ECU 60.

(Target Detecting Process)

Figure 2:
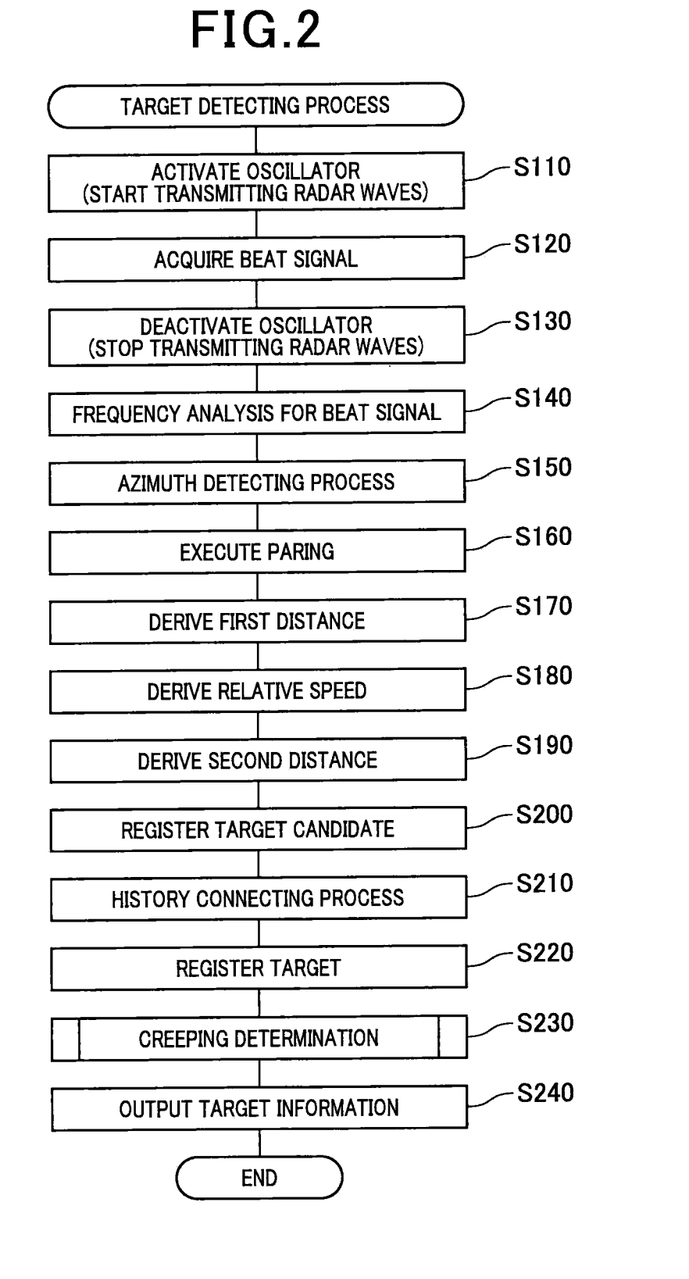
FIG. 2 is a flowchart showing a procedure for a target detecting process.

Next, the target detecting process executed by the signal processing unit 50 of the radar sensor 10 is described as follows. This target detecting process is activated at every measurement cycle which is determined in advance.

When the target detecting process is activated, as shown in FIG. 2, the signal processing unit 50 activates the oscillator 32 so as to start transmitting the radar waves (S110). Subsequently, the signal processing unit 50 acquires the sampling value of the beat signal BT via the A/D converter 46 (S120). When necessary amount of sampling values have been acquired, the signal processing unit 50 stops operation of the oscillator 32 to terminate the transmission of the radar waves (S130).

Next, frequency analysis (FFT processing according to the embodiment) is applied to the sampling values of the beat signal BT acquired at step S130 to acquire power spectrum of the beat signal BT for every reception channels CH-1 to CH-N at every upward and downward sections (S140). The power spectrum represents frequencies included in the beat signal BT and intensity of the respective frequencies thereof.

At step S140, respective peak frequencies fbu1 to fbum on the power spectrum at the upward section are extracted and respective peak frequencies fbd1 to fbdm on the power spectrum at the downward section are extracted. Each of the extracted peak frequencies fbu and fbd represents that a candidate of target (hereinafter referred to target candidate) reflecting radar waves may exist.

Next at step S150, an azimuth detecting process is executed. The azimuth detecting process estimates, for respective peak frequencies fbu and fbd, incoming azimuth of the target candidate and incoming power that represents reception power when the reflected waves from the target candidate are received. As an azimuth detecting process, a publicly known method, such as Multiple Signal Classification (MUSIC) or digital beam forming may be employed. The incoming azimuth according to the embodiment is defined as a direction (angle) where the target exists with respect to the reference axis set in the radar sensor 10.

Next, at step S160, based on the incoming azimuth and the incoming power estimated at step S150, pairing is applied to a peak frequency fbu from the upward section (i.e., among the peak frequencies fbu1 to fbum acquired from the beat signal BT at the upward section) and a peak frequency fbd from the downward section (i.e., among the peak frequencies fbd1 to fbdm acquired from the beat signal BT at the downward section) both representing the same target from which the radar waves are reflected. Then, the paired peak frequencies are registered. Hereinafter, the paired peak frequencies fbu and fbd which are registered is referred to as a frequency pair.

Specifically, at step S160 of the embodiment, the process determines, for all combinations of the frequency pairs from the peak frequency fbu at the upward section and the peak frequency fbd at the downward section, whether or not difference of the incoming power and difference of angle in the incoming azimuth are within a predetermined allowable range set in advance. As a result of determination at step S160, when the process determines that the difference of the incoming power and the difference of angle in the incoming azimuth are within the allowable range, the corresponding pair of peak frequencies is determined as a frequency pair.

At step S170, the first distance D (n) is derived from the registered frequency pair by using a well-known method applied to the FMCW radar apparatus. It is noted that the first distance D is a distance from the radar sensor 10 up to the target candidate and derived based on a period from when the radar waves are transmitted to when the incoming waves are received. It is noted that the signal processing unit 50, the driving support electronic control unit 60, steps S140, S150, S160 and S170 constitute the distance detecting unit.

At step S180, the relative speed Vz (n) between the target candidate and the present vehicle is derived from the registered frequency pair by using the well-known method applied to the FMCW radar apparatus. It is noted that the sign n is identifier representing nth measurement cycle, where n is positive integer number. It is noted that the signal processing unit 50, the driving support electronic control unit 60, steps S140, S150, S160 and S180 constitute the speed derivation unit.

Next at step S190, the process derives the second distance D' (n) based on the relative speed derived at step S180. The second distance D' is a distance from the radar sensor 10 up to the target candidate and derived based on the following equation (1). In the following equation (1), Δt represents time interval between measurement cycles. It is noted that the signal processing unit 50, the driving support electronic control unit 60, step S190 constitute the distance estimating unit.

$$D'(n)=D'(n-1)+Vz(n-1)\cdot \Delta t \qquad (1)$$

In other words, at step S190, an amount of change in distance (Vz (n)·Δt) at the current measurement cycle (n) is added to the second distance D' (n−1) which is detected at one cycle before the current measurement cycle, whereby the second distance D' (n) at the current measurement cycle is obtained. However, at step S190 of the embodiment, the amount of change in distance (Vz (n)·Δt) is added to the first distance D (n−1) until several measurement cycles (e.g., 5 measurement cycles) elapse from when the signal processing unit 50 activates the target detecting process.

Subsequently, in the target detecting process, based on the relative speed Vz between the target candidate and the present vehicle and the vehicle running speed, the process derives speed of the respective target candidates and determines whether the target candidate is a stopped object or a moving object (S200). At step S200, the process associates information including an azimuth where the target candidate exists, the acquired distance and the relative speed (running speed) with the respective frequency pairs, and registers the information associated with the respective frequency pair as a target candidate.

Furthermore, at step S210, the target detecting process executes, based on the information (i.e., distance, running speed and azimuth) regarding the frequency pair (hereinafter referred to current cycle pair) which is registered at step S190 of the current measurement cycle and the information regarding the frequency pair (hereinafter referred to previous cycle pair) registered at the previous measurement cycle, a history connecting process that detects a frequency pair corresponding to the same target.

Specifically, in the history connecting process (S210) according to the embodiment, the process sets all combinations between the previous cycle pairs and the current cycle pairs (hereinafter referred to combination pair) and obtains any one of combination pair among the all of combination pairs. Then, the process derives a location where the current cycle pair corresponding to its previous cycle pair exists, which is estimated based on information of previous cycle pair at the obtained combination pair (hereinafter referred to estimated location), and speed corresponding to the current cycle pair (herein referred to estimated speed). Since the process to derive the estimated location and the estimated speed is a well-known process, detailed explanation is omitted. However, for example, the estimated location and the estimated speed can be obtained as follows. That is, the process estimates behavior of the frequency pair (i.e., target candidate) with respect to time by using such as Kalman filter and determines the estimated location and the estimated speed based on the estimated result.

Then, in the history connecting process, based on the estimated location and estimated speed, and the location and the speed derived from the current cycle pair, the process acquires location difference and speed difference. Specifically, the process acquires the location difference between the location derived from the current cycle pair (i.e., location of the target candidate corresponding to the current cycle pair) and the estimated location, and the speed difference between the speed derived from the current cycle pair (i.e., speed of the target candidate corresponding to the current cycle pair) and the estimated speed.

Then, when the location difference is smaller than a predetermined reference distance and the speed difference is smaller than a predetermined upper-limit speed difference, the process determines that the frequency pair constituting this combination pair corresponds to the same target. That is, the process determines there is a history connection. Subsequently, the process updates a count value of the connection counter corresponding to the current cycle pair to be a value incremented by 1 from a count value of the connection counter corresponding to the previous cycle pair.

According to the history connecting process of the embodiment, the current cycle pair which has a history connection with the previous cycle pair receives the information (count value of the connection counter) of corresponding previous cycle pair and the current cycle pair which does not have a history connection keeps the count value to be zero.

In the target detecting process, at step S220, the process recognizes a frequency pair, in which the history connection meets a predetermined recognition threshold, to be a target (hereinafter referred to as definite target) and registers the definite target. Specifically, at step S220 according to the embodiment, the process determines that the history connection meets a predetermined recognition threshold when the count value of the connection counter is greater than or equal to the predetermined recognition threshold.

At step S220 according to the embodiment, the process identifies type of respective definite targets and generates the first distance D, the second distance D', the relative speed Vz, the azimuth and the target information associated with the type of target and registers them.

It is noted that the type of targets includes a preceding vehicle and a road side target. Since the method determining the target to be the preceding vehicle is well-known method, detailed explanation thereof is omitted. However, for example, it is considered that a definite target which is closest to the present vehicle among targets (object) existing on a route where the present vehicle is proceeding (i.e., proceeding route). Since the method for determining the object to be a road side object is a well-known method, detailed explanation thereof is omitted. However, for example, it is considered that a definite target disposed along the proceeding route among stopped objects can be determined as a road side object.

In the target detecting process, based on the registered target information, at step S230, the process executes a creeping determining process to determine whether or not a creeping is occurred. It is noted that the creeping is a phenomena where radar waves get under the chassis of the preceding vehicle so that the radar apparatus erroneously recognizes a distance up to a front part of the preceding vehicle rather than the back end of the preceding vehicle to be the first distance D.

In other words, when creeping has not occurred, the radar waves transmitted from the radar sensor 10 are usually reflected at the back end of the preceding vehicle so that the radar apparatus is able to detect the distance between the present vehicle and the back end of the preceding vehicle to be the first distance D and the second distance D' (see FIG. 6A).

However, depending on the height of the present vehicle in the vehicle height direction where the radar sensor 10 is mounted, the radar waves get under the chassis of the preceding vehicle. In this case, since the radar waves are reflected at an object (e.g., drive shaft) disposed in a front side of the vehicle rather than the back end of the vehicle, the radar apparatus recognizes the distance up to the object to be the first distance D (See FIG. 6B). Since the relative speed Vz between the present vehicle and the preceding vehicle does not vary depending on a location where the radar waves are reflected, the second distance D' substantially equals to a distance up to the back end of the preceding vehicle.

In the creeping determining process according to the embodiment, based on the deviation quantity between the first distance D and the second distance D', the process determines whether or not a creeping has occurred. Regarding detailed explanation about the creeping determining process is described later. The radar sensor 10 executes the creeping determining process and serves as a driving-in detecting apparatus described in the claims.

At step S240, the target detecting process further outputs the target information about the registered definite target to the driving support ECU 60. The target information which is outputted at step S240 includes a distance up to the preceding vehicle derived at the creeping determining process which is described later.

Subsequently, the process terminates the target detecting process at the current cycle and waits for the next activation cycle.

(Creeping Determining Process)

Figure 3:
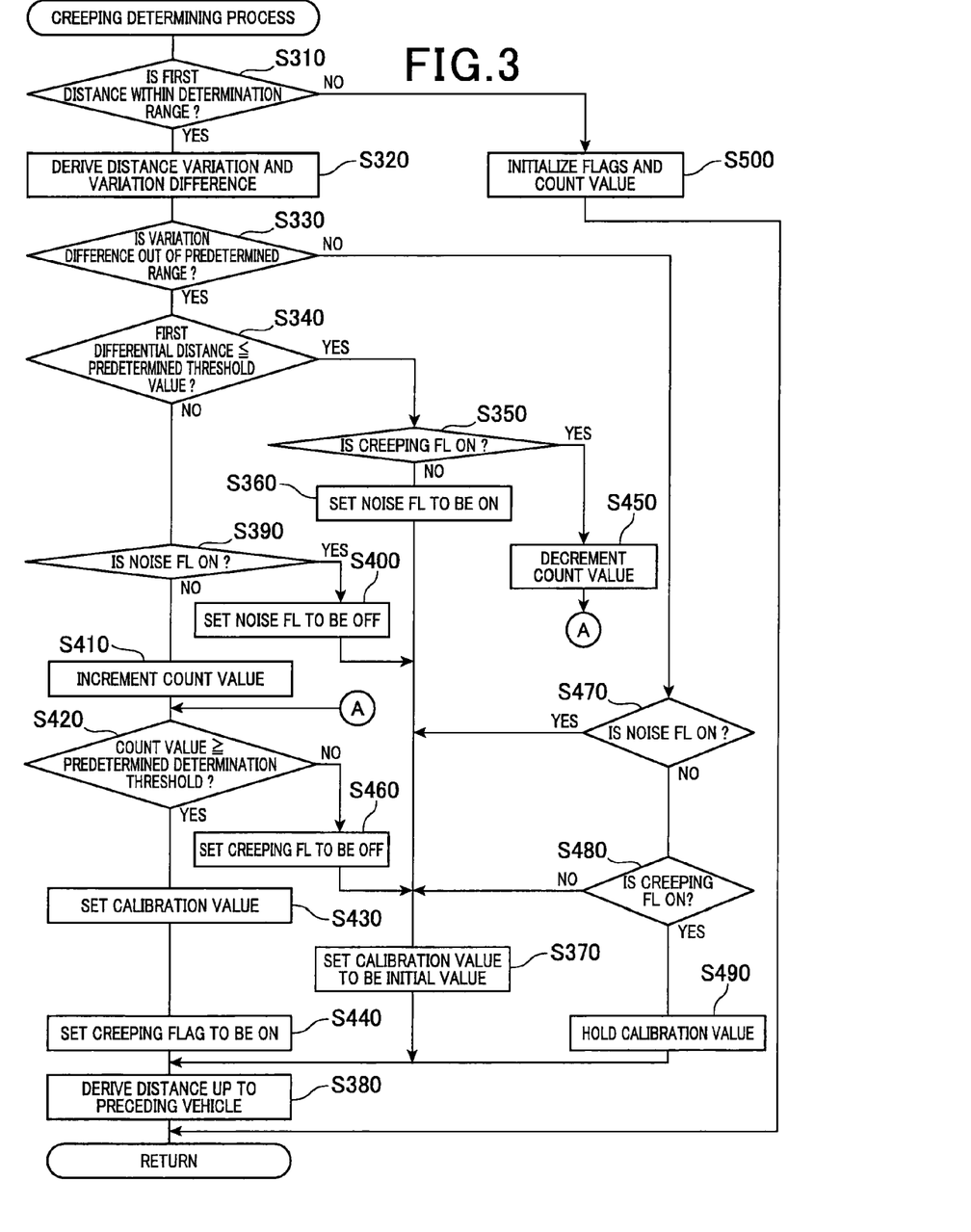
FIG. 3 is a flowchart showing a procedure for a creeping determining process.

The creeping determining process which is activated at step S230 in the target detecting process determines whether or not the first distance D (n) of the definite target recognized as a preceding vehicle (hereinafter referred to object first distance) is within a determination range (S310). The determination range is a range between the present vehicle and the preceding vehicle in which a creeping is likely to occur. This determination range is determined in advance based on the height in the vehicle height direction at which the radar sensor 10 is mounted and an irradiation angular range of the radar waves radiated from the radar sensor 10.

As a result of the determination at step S310, when the object first distance D (n) is within a determination range (S310: YES), the process determines that the creeping has occurred and proceeds to step S320.

At step S320, the process derives the first differential distance which is a difference in the object first distance D (i.e., an example of the first variation), the second differential distance which is a difference in the object second distance D' (i.e., an example of the second variation) and the variation difference which is a deviation quantity between the first differential distance and the second differential distance. At step S320 according to the embodiment, the first differential distance can be derived by subtracting the object first distance D (n−1) from the object first distance D (n).

The second differential distance can be derived by subtracting the object second distance D' (n−1) from the object second distance D' (n). It is noted that the object second distance D' is the second distance D' of the definite target recognized as a preceding vehicle.

Moreover, at step S320 according to the embodiment, the variation difference can be derived by subtracting the second differential distance from the first differential distance. Further, in the creeping determining process, at step S330, the process determines whether or not the variation difference derived at step S320 is out of predetermined range (i.e., an example of the predetermined threshold). When the variation difference is within the predetermined range as a result of determination at step S330 (S330: NO), the process determines that it is unlikely creeping has occurred, then the process proceeds to step S470 (described later).

Meanwhile, when the process determines that the variation difference is out of the predetermined range as a result of step S330 (S330: YES), the process determines that it is likely a creeping has occurred and proceeds to step S340. Subsequently, at step S340 in which the creeping determining process is executed, the process determines whether or not the first differential distance is less than or equal to a predetermined threshold value Th. The predetermined threshold value Th is a negative value representing that the present vehicle and the preceding vehicle come closer.

When the first differential distance is larger than the predetermined threshold value Th as a result of the determination at step S340, the process determines that a creeping has occurred and proceeds to step S390 (described later).

Meanwhile, when the process determines that the first differential distance is less than or equal to the predetermined threshold value Th (S340: YES) as a result of the determination at step S340, the process determines that a creeping has not occurred and proceeds to step S350. In step S350, the process determines whether or not a creeping flag (indicated as creeping FL in FIG. 3) has set.

The creeping flag represents whether or not a creeping has occurred. Specifically, when the creeping flag has set, a creeping has occurred and when the creeping flag has not set, the creeping has not occurred.

As a result of the determination at step S350, when the creeping flag is not set (S350: NO), the process sets a noise flag (S360). The noise flag represents whether or not the factor causing the variation difference being out of the predetermined range, is a change of the actual distance between the present vehicle and the backend of the preceding vehicle. Specifically, when the noise flag is set, the factor causing the variation difference being out of the predetermined range is a change of the actual distance between the present vehicle and the backend of the preceding vehicle.

Figure 4A:
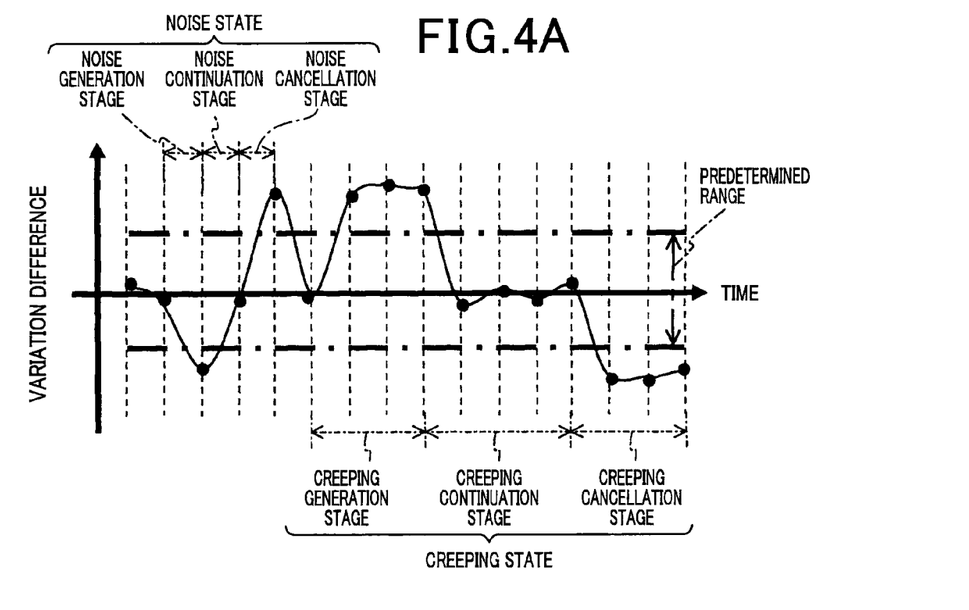
FIG. 4A is a graph showing a change in the variation difference.
Figure 4B:
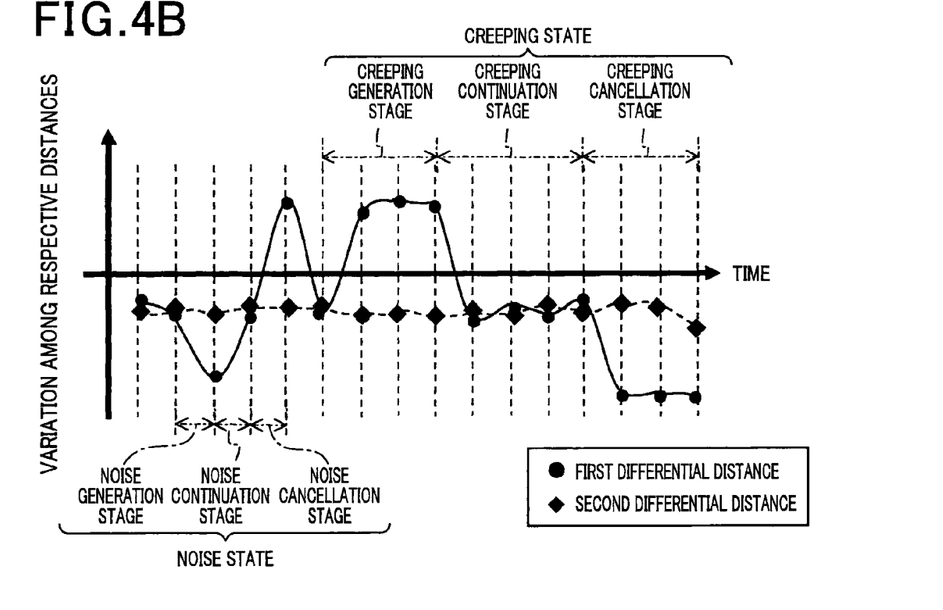
FIG. 4B is a graph showing a change in the first differential distance and the second differential distance.

In other words, although the variation difference is out of the predetermined range, when the first differential distance is less than or equal to the predetermined threshold value Th and the creeping flag is not set, it is considered that the preceding vehicle keeps its running speed and only the present vehicle accelerates or the present vehicle keeps its running speed and only the preceding vehicle decelerates (i.e., noise state (noise generation stage) indicated in FIGS. 4A and 4B). In these cases, since the factor causing the variation difference being out of the predetermined range is a change of the actual distance between the present vehicle and the backend of the preceding vehicle, the process sets the noise flag.

Subsequently, in the creeping determining process, the process sets a calibration value to be an initial value (S370) and derives a distance up to the preceding vehicle at step S380. At step S380 according to the embodiment, the process subtracts the calibration value from the object first distance D (n) to derive the distance up to the preceding vehicle.

It is noted that the initial value which is set at step S370 is 0. Therefore, when the process moves to step S380 from step S370, the object first distance D (n) is derived as a distance up to the preceding vehicle. It is noted that the signal processing unit 50, the driving support electronic control unit 60, steps S370, S380, S430 and S490 constitute the distance recognition unit.

Then, the process terminates the creeping determining process and returns to step S240 where the target detecting process is executed. At step S390 executed when the first differential distance is larger than the predetermined threshold value Th (S340: NO) as a result of determination at step S340, the process determines whether or not the noise flag (indicated as noise FL in FIG. 3) is set.

When the noise flag is set as a result of the determination at step S390 (S390: YES), the process resets the noise flag (S400) and proceeds to step S370. That is, in a case where the first differential distance is larger than the predetermined threshold value Th and the noise flag is set, the preceding vehicle keeps its running speed and only the present vehicle is decelerating or the present vehicle keeps its running speed and only the preceding vehicle is accelerating (i.e., noise state (noise cancellation stage) indicated in FIGS. 4A and 4B). In these cases, the factor that makes the object first distance D extend is considered that the inter vehicle distance between the present vehicle and the back end of the preceding vehicle has become larger so that the noise state is changing to the noise cancellation stage. Accordingly, the process resets the noise flag at step S400.

Subsequently, at step S370, the process sets the calibration value to be the initial value and derives the distance up to the preceding vehicle (S380). Then, the process terminates the creeping determining process and returns to step S240 where the target detecting process is executed. At step S390, when the noise flag is not set (S390: NO), the process determines that it is very likely creeping has occurred and increments the count value of the time counter (S410).

Next at step S420, the process determines whether or not the count value of the time counter is larger than or equal to the predetermined determination threshold. When the determination result at step S420 shows that the count value is less than the determination threshold (S420: NO), the process proceeds to step S460 (described later).

Meanwhile, when the count value is larger than or equal to the determination threshold as a result of the determination at step S420 (S420: YES), the process determines that a creeping has occurred (i.e., creeping state (creeping generation stage) as shown in FIGS. 4A and 4B) and derives/sets the calibration value (S430). Specifically, at the step S430, the process subtracts the object second distance D' (n) from the object first distance D (n) to derive the calibration value.

Next at step S440, in the creeping determining process, the process sets the creeping flag (indicated as creeping FL in FIG. 3) and derives a distance up to the preceding vehicle (S380). In the step S380, the process subtracts the calibration value set at step S430 from the object first distance D (n) to derive the distance up to the preceding vehicle and adds the derived distance to the target information corresponding to the preceding vehicle.

Then, the process terminates the creeping determining process and returns to step S240 where the target detecting process is executed. As a result of determination, when the creeping flag is set (S350: YES), the process proceeds to step S450.

In other words, although the variation difference is out of the predetermined range, when the first differential distance is less than or equal to the predetermined threshold value Th and the creeping flag is set, it is considered that the creeping state is in a transient state (i.e., period where the creeping is released as shown in FIGS. 4A and 4B) in which the state is changing from a state where creeping has occurred to a state where creeping is released.

Accordingly, at step S450, the process decrements the count value of the time counter by one and proceeds to step S420. When the count value of the time counter is larger than or equal to the determination threshold (S420: YES) as a result of the determination at step S420, the process derives/sets the calibration value at step S430. Then, the process keeps the creeping flag active (S440) and subtracts the calibration value derived at step S430 from the object first distance D (n) to derive the distance up to the preceding vehicle (S380). It is noted that the signal processing unit 50, the driving support electronic control unit 60, steps S310, S320, S330, S340, S350, S360, S370, S380, S390, S400, S410, S420, S430, S440, S450, S460, S470, S480, S490 and S500 constitute the creeping detecting unit.

Then, the process terminates the creeping determining process and returns to step S240 where the target detecting process is executed. The process resets the creeping flag since the creeping is released or the creeping has not occurred when the count value of the time counter is less than or equal to the determination threshold (S420: NO). Subsequently, the process sets the calibration value to be the initial value at step S370 and derives the distance up to the preceding vehicle at step S380.

Then, the process terminates the creeping determination process and returns to step S240 where the target detecting process is executed. At step S470 executed when the variation difference is within the predetermined range as a result of the determination at step S330, the process determines whether or not the noise flag is set. When the process determines that the noise flag is set (S470: YES), the process determines that the noise state has been continuing (i.e., noise continuation stage as shown in FIGS. 4A and 4B) and proceeds to step S370.

When the noise flag is not set as a result of the determination at step S470 (S470: NO), the process determines whether or not the creeping flag is set (S480). When the creeping flag is not set (S480: NO) as a result of the determination at step S480, the process proceeds to step S370. Meanwhile, when the creeping flag is set as a result of the determination at step S480 (S480: YES), the process determines that the creeping has continued (creeping continuation period as shown in FIGS. 4A and 4B) and holds the calibration value set at step S430 (S490).

Subsequently at step S380, the process derives the distance up to the preceding vehicle. Then, the process terminates the creeping determining process and returns to step S240. The process proceeds to step S500 when the object first distance D (n) is out of the determination range (S310: NO). In the step S500, the process initializes the noise flag, the creeping flag and the count value of the time counter. That is, the process resets the noise flag and the creeping flag and initializes the count value of the time counter (e.g. set to 0).

Then, the process terminates the creeping determination process and returns to step S240 where the target detecting process is executed. In the creeping determination process according to the embodiment, the process predicts that it is very likely the creeping has occurred when the variation difference that represents a deviation quantity between the object first distance D and the object second distance D' is out of the predetermined range and the first differential distance is larger than the predetermined threshold. Further, the creeping determining process determines that the creeping has occurred when it is very likely that possible creeping continues for a plurality of measurement cycles, then the process calibrates the distance up to the preceding vehicle.

Advantages of the Embodiment

The radar sensor 10 detects the first distance D and the second distance D' as substantially the same distance when the creeping has not occurred. However, when the creeping occurs, the first distance D derived in the radar sensor 10 is longer than the distance up to the back end of the preceding vehicle and the second distance D' derived in the radar sensor 10 is approximately the distance up to the back end of the preceding vehicle.

Therefore, the radar sensor 10 can detect, by detecting the deviation quantity between the first distance D and the second distance D', whether or not a creeping has occurred. According to the embodiment, the process determines whether or not the creeping has occurred based on the variation difference. Since the variation difference is a difference between an amount of change in the first distance D and an amount of change in the second distance D', the radar sensor 10 can improve the accuracy for determining occurrence of the creeping.

Now, the first distance D and the second distance D' become shorter when the preceding vehicle decelerates. Accordingly, in the radar sensor 10, even when the variation difference is out of the predetermined range, the process can determine that the creeping has not occurred if the first differential distance represents that the distance between the present vehicle and the target becomes short.

According to the above-described radar sensor 10, erroneous detection in which a change in the first distance due to deceleration of the preceding vehicle is detected as an occurrence of the creeping, can be reduced. It is noted that the creeping determination process according to the embodiment uses a condition that the count value is larger than or equal to the determination threshold (i.e., differential distance has been larger than or equal to the predetermined threshold for a predetermined period) as a condition that the creeping has occurred.

Therefore, the radar sensor 10 prevents the creeping determination process from erroneously detecting creeping when the variation difference instantaneously exceeds the predetermined range and the first differential distance falls below the predetermined threshold.

Figure 5:
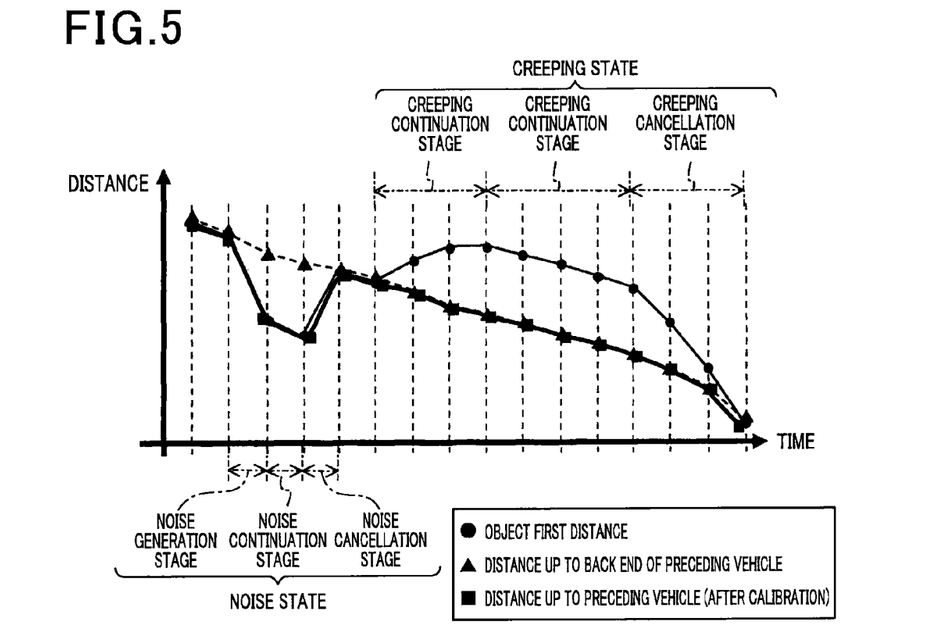
FIG. 5 is an explanatory diagram showing an effect of the embodiment.

With these situations, according to the above-described radar sensor 10, accuracy for detecting the creeping can be significantly improved. Further, in the radar sensor 10, when it is determined that the creeping has occurred, a value that the object second distance D' (n) is subtracted from the object first distance D (n) is used as a calibration value so as to derive the distance up to the preceding vehicle. As shown in FIG. 5, the distance up to the preceding vehicle derived by the radar sensor 10 while the creeping has occurred approximates to the actual distance up to the back end of the preceding vehicle.

Therefore, according to the above-described radar sensor 10, even when the creeping occurred, the radar sensor 10 can accurately detect the actual distance between the present vehicle and the target.

Other Embodiments

The embodiment of the present disclosure is described above. The present disclosure is not limited to the above-described embodiment, however, various modifications can be made without departing from the scope of the present disclosure.

For example, according to the above-described embodiment, the creeping determining process is executed by the signal processing unit 50 of the radar sensor 10. However, the creeping determining process may be executed by the driving support ECU 60.

At step S380 in the creeping determining process according to the embodiment, the calibration value is derived by subtracting the object second distance D' (n) from the object first distance D (n), however, it is not limited to this method to derive the calibration value. For example, the calibration value may be derived from a value in which the object second distance D' is subtracted from the object first distance D (n) and the subtracted value is multiplied by a predetermined coefficient. In this case, the predetermined coefficient can be set such that the longer an elapse time from a time when an occurrence of the creeping is detected, the larger the predetermined coefficient or the predetermined coefficient can be set as a value which is proportional to a difference between the object first distance D(n) and the object second distance D'(n).

In other words, the calibration value can be derived to approximate smoothly a value in which the object second distance D' (n) is subtracted from the object first distance D (n), based on the elapse time from a time when an occurrence of the creeping is detected.

In the above-described creeping determining process according to the embodiment, the process determines whether or not creeping has occurred based on the variation difference. However, the information used to determine whether or not the creeping has occurred (i.e., differential distance) is not limited to the variation difference. For example, a difference value between the object first distance D (n) and the object second distance D (n−1) can be employed. Specifically, the information used to determine whether or not creeping has occurred can be any information as long as the information represents the deviation quantity between the object first distance D (n) and the object second distance D (n−1).

In this case, according to the present disclosure, the process may determine the creeping has occurred when the value (i.e., differential distance) where the object second distance D (n−1) is subtracted from the object first distance D (n) is larger than or equal to the predetermined threshold.

According to the above-described embodiment, the second distance D' is derived in the target detecting process at step S190. However, it is not limited to a timing of the step S190 to derive the second distance D'. For example, the second distance D' can be derived at any timing before the variation difference is derived in the creeping determining process.

It is noted that a part of configuration of the above-described embodiment can be simplified as long as the problem is solved. Also, a configuration in which the above-described embodiment appropriately combined with a modification thereof can be regarded as an embodiment of the present disclosure. Further, possible embodiments without departing the essential feature of the present disclosure can be regarded as embodiments of the present disclosure.

What is claimed is:

1. An apparatus for detecting a creeping of radar waves comprising:
   a transmitter transmitting radar waves at every predetermined measurement cycle, frequency of the radar waves being modulated to be increased or decreased with respect to time;
   a receiver receiving incoming waves which are reflected waves of the radar waves transmitted by the transmitter, mixing the radar waves being transmitted by the transmitter with the incoming waves received by the receiver and generating a beat signal at every measurement cycle;
   a distance detecting unit detecting, based on the beat signal generated by the receiver, a first distance which is a distance up to a target reflecting the radar waves;
   a speed derivation unit deriving a relative speed relative to the target reflecting the radar waves;
   a distance estimating unit estimating, based on the relative speed derived by the speed derivation unit, a second distance which is a distance up to a target reflecting the radar waves; and
   a creeping detecting unit adapted to derive a differential distance representing a deviation quantity between the first distance and the second distance based on the first distance detected by the distance detecting unit and the second distanced estimated by the distance estimating unit and determine whether or not creeping has occurred in accordance with whether or not the differential distance is larger than or equal to a predetermined threshold.

2. The apparatus according to claim 1, wherein
the creeping detecting unit determines the creeping has occurred when the differential distance is larger than or equal to the predetermined threshold.

3. The apparatus according to claim 2, wherein
the creeping detecting unit determines the creeping has occurred when the differential distance is larger than or equal to the predetermined threshold for more than a predetermined period.

4. The apparatus according to claim 1, wherein
the creeping detecting unit includes a distance recognition unit adapted to derive a calibration value in which the second distance is subtracted from the first distance and recognize a distance in which the calibration value is subtracted from the first distance to be a distance up to the target, when the creeping detecting unit determines that creeping has occurred.

5. The apparatus according to claim 2, wherein
the creeping detecting unit includes a distance recognition unit adapted to derive a calibration value in which the second distance is subtracted from the first distance and recognize a distance in which the calibration value is subtracted from the first distance to be a distance up to the target, when the creeping detecting unit determines that creeping has occurred.

6. The apparatus according to claim 3, wherein
the creeping detecting unit includes a distance recognition unit adapted to derive a calibration value in which the second distance is subtracted from the first distance and recognize a distance in which the calibration value is subtracted from the first distance to be a distance up to the target, when the creeping detecting unit determines that creeping has occurred.

7. The apparatus according to claim 4, wherein
the distance recognition unit recognizes the first distance to be the distance up to the target, when the creeping detecting unit determines that creeping has not occurred.

8. The apparatus according to claim 1, wherein
the creeping detecting unit includes a variation derivation unit adapted to derive, based on the first distance and the second distance which are derived from a plurality of measurement cycles with respect to time, a first variation representing a variation of the first distance and a second variation representing a variation of the second distance, and
the creeping detecting unit determines whether or not creeping has occurred based on a difference between the first variation and the second variation, as the differential distance.

9. The apparatus according to claim 2, wherein
the creeping detecting unit includes a variation derivation unit adapted to derive, based on the first distance and the second distance which are derived from a plurality of measurement cycles with respect to time, a first variation representing a variation of the first distance and a second variation representing a variation of the second distance, and
the creeping detecting unit determines whether or not creeping has occurred based on a difference between the first variation and the second variation, as the differential distance.

10. The apparatus according to claim 3, wherein
the creeping detecting unit includes a variation derivation unit adapted to derive, based on the first distance and the second distance which are derived from a plurality of measurement cycles with respect to time, a first variation representing a variation of the first distance and a second variation representing a variation of the second distance, and
the creeping detecting unit determines whether or not creeping has occurred based on a difference between the first variation and the second variation, as the differential distance.

11. The apparatus according to claim 1, wherein
the creeping detecting unit determines that creeping has not occurred when a variation of the first distance derived from a plurality of measurement cycles represents that the distance up to the target becomes shorter.

12. The apparatus according to claim 2, wherein
the creeping detecting unit determines that creeping has not occurred when a variation of the first distance derived from a plurality of measurement cycles represents that the distance up to the target becomes shorter.

13. The apparatus according to claim 3, wherein
the creeping detecting unit determines that creeping has not occurred when a variation of the first distance derived from a plurality of measurement cycles represents that the distance up to the target becomes shorter.

* * * * *